United States Patent [19]

Hünger

[11] 4,362,304
[45] Dec. 7, 1982

[54] PACKING ARRANGEMENT FOR A FLOATING PISTON

[76] Inventor: Walter Hünger, Otto-Nagler-Str. 13, D-8700 Wuerzburg, Fed. Rep. of Germany

[21] Appl. No.: 211,279

[22] Filed: Nov. 28, 1980

[30] Foreign Application Priority Data

Nov. 28, 1979 [DE] Fed. Rep. of Germany ....... 2947895

[51] Int. Cl.$^3$ .............................................. F16J 15/48
[52] U.S. Cl. ...................................... 277/27; 277/70; 277/195; 277/198
[58] Field of Search ................... 277/3, 27, 75, 76, 70, 277/198, 194, 193, 195

[56] References Cited

U.S. PATENT DOCUMENTS

| | | | |
|---|---|---|---|
| 688,571 | 12/1901 | Airey | 277/70 X |
| 1,392,035 | 9/1921 | Williams | 277/70 |
| 1,444,407 | 2/1923 | Wefing | 277/75 |
| 1,527,834 | 2/1925 | Bullis | 277/194 |
| 2,417,873 | 3/1947 | Huber | 138/31 |
| 3,831,950 | 8/1974 | Bentley et al. | 277/75 |

FOREIGN PATENT DOCUMENTS

| | | | |
|---|---|---|---|
| 688624 | 2/1940 | Fed. Rep. of Germany | 277/75 |
| 1578107 | 8/1969 | France | |
| 481714 | 12/1975 | U.S.S.R. | |

*Primary Examiner*—Robert S. Ward, Jr.
*Attorney, Agent, or Firm*—Schwartz, Jeffery, Schwaab, Mack, Blumenthal & Koch

[57] ABSTRACT

A packing arrangement for a floating piston dividing a cylinder into first and second chambers comprising a circumferential groove formed in the sliding surface of the floating piston; a circumferential elevation dividing the bottom of the groove into first and second spaces situated on either side of the elevation; backing material placed in the groove; a sealing ring radially situated upon the backing material; first and second extensions on the backing material projecting into the first and second spaces, respectively; each extension having first and second lips forming an annular space between the bottom of the groove and the internal surface of the backing material; the first lip of each extension abutting a lateral wall of the groove and the second lip of each extension abutting a lateral surface of the elevation; a first pressure channel connecting the first chamber with the annular space formed by the first extension; and a second pressure channel connecting the second chamber with the annular space formed by the second extension.

5 Claims, 2 Drawing Figures

PACKING ARRANGEMENT FOR A FLOATING PISTON

BACKGROUND OF THE INVENTION

The present invention generally relates to a floating piston for a pressure storage device and more particularly to a packing arrangement for sealing the sliding surface between the piston and a cylinder wall of the pressure storage device.

Piston pressure storage devices of this type are used to store pressure energy which is released as needed to a hydraulic system, such as, to supply a short-term requirement for a high fluid volume to alternate impacts and vibrations, to maintain pressure in the case of a pump failure, to compensate for leaking losses or for pressure- and volume-variations in a closed system, and the like.

Since no large pressure gradients between the sliding surface of the floating piston and the cylinder wall of the storage device appear at the packing, the danger of leaking or of the passing of the pressurized media to the other side of the piston appear to be slight. However, in pressure storage devices, such as hydropneumatic energy storage devices, the reliable separation of the hydraulic pressure liquid from the volume of pressurized gas is extremely important, because the penetration of a liquid in the gaseous space would interfere with proper functioning and would reduce the useful volume of the gaseous space. Also, any gas entering the liquid space, possibly after dissolution in the liquid, may be carried into the hydraulic system and can cause problems at other locations of this system, such as, favor the appearance of cavitation. In the past, a separating wall in the shape of an elastic bladder has been used. Regrettably, such devices have the disadvantage of a short operational life.

Prior art piston packings are known utilizing a pressure conduit situated between the frontal surface of the piston on the pressure side and the lateral wall of a circumferential piston ring groove containing a packing material. The pressure acting on the lateral sealing surface is propagated to all sides of the packing material and forces the external circumferential surface of the packing material against the sliding surface of the cylinder. This arrangement provides a seal capable of withstanding higher medium pressure and prevents the passage of the medium across the seal. However, this configuration provides no assurance that the pressure introduced by the pressure channel will actually be converted into a radially outward pressure force, that is, uniform over the entire axial dimension of the packing material.

A somewhat more advantageous configuration is known, wherein the pressure channel opens not at the frontal surface of the packing but into its internal circumference so that the pressure introduced in this manner is directed radially outward against the packing material. Such a design may be found, for example, in U.S. Pat. No. 2,799,523. The disadvantage of this configuration is that the pressurized medium exerted against the rearside of the packing material may readily leak along the surface of the packing groove and to the other side, so that a reliable separation between the cylinder chambers divided by the piston is not assured. Accordingly, this is not an acceptable arrangement for floating pistons where medium separation is necessary.

Increasing the reliable separation of the pressurized media can be achieved by means of two successively arranged packings on the piston although difficulties can arise because an uncontrolled pressure can build up in the annular gap between the packings which can drive the packing material apart resulting in increased friction and finally destruction of the packing material.

Alternatively, difficulties may arise when the pressure in the annular gap between the packings is too low. This is common in piston pressure storage devices wherein the piston moves in a relatively thin cylinder liner, surrounded by a pressure vessel in communication with the gas of the cylinder liner adapted to absorb the operating pressure. When the piston pressure storage device with the cylinder liner is not under pressure and then subjected to a sudden increase in pressure, the pressure in the annular gap between the packings will not build up immediately. Concurrently, the cylinder liner is exposed to a high pressure from the outside, so that it may be deformed and bent inwardly over the axial distance between the two packings, whereby the surface of the piston may jam or in any case be exposed to increased friction.

SUMMARY OF THE INVENTION

The object of the present invention is to provide a floating piston with a packing material which assures the reliable separation of the liquid medium from the gas medium, while avoiding the above-described difficulties.

In order to accomplish the foregoing object according to the present invention, there is provided a packing arrangement for a floating piston dividing a cylinder into first and second chambers comprising a circumferential groove formed in the sliding surface of the floating piston, a circumferential elevation dividing the bottom of the groove into first and second spaces situated on either side of the elevation; backing material placed in the groove; a sealing ring radially situated upon the backing material; first and second extensions on the backing material projected into the first and second spaces respectively; each extension having first and second lips forming an annular space between the bottom of the groove and the internal surface of the backing material; the first lip of each extension abutting a lateral wall of the groove and the second lip of each extension abutting a lateral surface of the elevation; a first pressure channel connecting the first chamber with the annular space formed by the first extension; and a second pressure channel connecting the second chamber with the annular space formed by the second extension. The first and second lips of each extension end in a point and are formed by splitting the extensions. In a preferred embodiment, the circumferential elevation has bevelled sides. Also, the sealing ring can include a circumferential groove abutting the sliding surface of the cylinder filled by a lubricating deposit.

DETAILED DESCRIPTION OF PREFERRED EMBODIMENTS

The invention is a packing arrangement for the floating piston of a piston pressure storage device wherein an elastic backing material is placed in a circumferential groove with a seal ring being radially situated on the backing material. A pressure channel originating in one of the frontal surfaces of the piston opens into an annular space between the bottom of the circumferential groove and the internal surface of the backing material.

The bottom of the groove is provided with a circumferential elevation and the backing material is provided with a pair of extensions which project into the spaces on both sides of the elevation. Each extension is split to form lips ending in a point. One of the lips of each extension abuts against the lateral surface of the groove and the other lip of each extension against the lateral surface of the elevation facing the groove. A pair of pressure channels open into the space formed between the lips of each extension.

Such a configuration presses the packing radially outward against the sliding surface of the cylinder utilizing a pressure force, acting radially and reliably over the entire axial extent of the packing. The danger of leakage of one medium into the chamber of the other medium is practically excluded, because two reliable sealing locations are present in the potential path of such a passage, in the form of the two sealing lips abutting against the elevation.

It is convenient to provide the lateral surfaces of the circumferential elevation in a bevelled configuration, because the abutting sealing lips have the tendency to slide off in a radially outward direction under the action of the pressure communicating through the channels. This improves the pressure of the packing material against the sliding surface of the cylinder.

Figure 1:
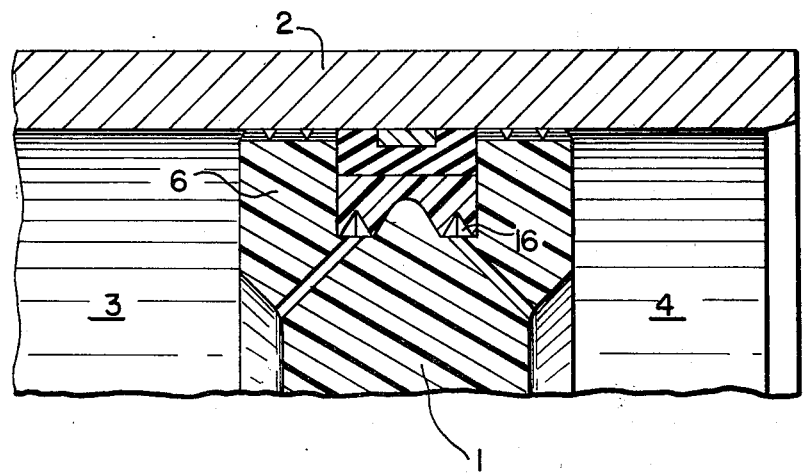
FIG. 1 illustrates a cross-sectional view of the floating piston according to the present invention.
Figure 2:
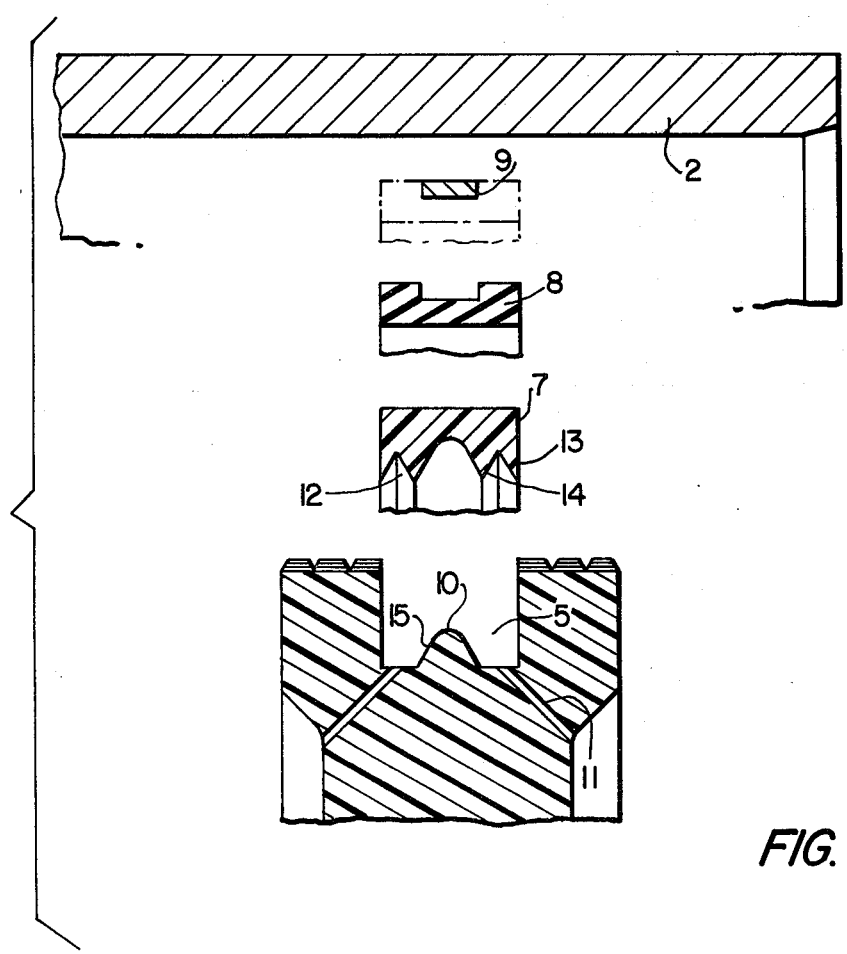
FIG. 2 is an exploded view of the packing arrangement of the present invention.

The floating piston illustrated in FIG. 1 is movably situated in a cylinder 2 and separates a gas chamber 3 from a liquid chamber 4. The packing material 6 is located in a circumferential groove 5 formed on the sliding surface of the floating piston and comprises an elastic backing material 7 having a seal ring 8 radially surrounding the backing material 7. The seal ring 8 may be made of a polytetrafluoroethylene material or any suitable sealing material. The seal ring 8 has a groove in the surface facing the sliding surface of the cylinder, wherein a lubricating deposit 9, for example, graphite oil or the like is placed.

On the bottom of the circumferential piston groove 5, a circumferential elevation 10 is formed with at least one pressure channel 11 on either side of the elevation 10, opening into the bottom of the groove, the channels 11 originating from each adjacent frontal surface of the piston. Preferably, a plurality of such pressure channels is distributed uniformly along the bottom of the groove 5.

The backing material 7 is shaped to conform with the cross-section of the bottom of the groove 5 and includes extensions 12 which project in the spaces on either side of the elevation 10. Each extension is split to form two sealing lips 13 and 14 each. The sealing lip 13 abuts against the lateral surface of the groove 5 and the sealing lip 14 against the lateral surface 15 of the elevation 10.

The lateral surfaces 15 are bevelled off in a manner so that the inner sealing lips 14 have the tendency to slide off in the radially outward direction when pressure is applied to the annular spaces 16, formed between the sealing lips 13 and 14, whereby the radially outward acting pressing force of the packing material is further improved.

During the operation of pressure storage devices equipped with the floating piston described hereinabove, substantially equal pressures are present in both the gas chamber 3 and the liquid chamber 4 so that equal pressures are acting on both sides of the piston. These pressures are transmitted by the pressure channels 11 and act upon the edge zones of the packing material 6 by expanding into the annular pressure spaces 16 formed between the sealing lips 13, 14 to provide a pressure acting in these areas directed in the radially outward direction.

The passage of one pressure medium into the space of the other medium along a path on the bottom of the groove 5 is reliably prevented since the annular pressure spaces 16 are separated from each other by two sealing locations, i.e., by the two lateral surfaces 15 of the elevation 10, against which the inner sealing lip 14 of the extension 12 is pressed.

What is claimed is:

1. A packing arrangement for a floating piston dividing a cylinder into first and second chambers comprising:
   a circumferential groove formed in the sliding surface of said floating piston;
   a circumferential elevation dividing the bottom of said groove into first and second spaces situated on either side of said elevation;
   backing material placed in said groove;
   a sealing ring radially situated upon said backing material;
   first and second extensions on said backing material projecting into said first and second spaces, respectively;
   each extension having first and second lips forming an annular space between the bottom of said groove and the internal surface of said backing material;
   said first lip of each extension abutting a lateral wall of said groove and said second lip of each extension abutting a lateral surface of said elevation;
   a first pressure channel connecting the first chamber with said annular space formed by said first extension; and
   a second pressure channel connecting the second chamber with said annular space formed by said second extension.

2. The packing arrangement as recited in claim 1, wherein said first and second lips of each extension end in a point and are formed by splitting said extensions.

3. A packing arrangement as recited in claim 1, wherein said circumferential elevation has bevelled sides.

4. The packing arrangement as recited in claim 1, wherein said sealing ring includes a circumferential groove abutting the sliding surface of the cylinder filled by a lubricating deposit.

5. The packing arrangement as recited in claim 4, wherein said lubricating deposit is graphite oil.

* * * * *

UNITED STATES PATENT AND TRADEMARK OFFICE
CERTIFICATE OF CORRECTION

PATENT NO. : 4,362,304
DATED : December 7, 1982
INVENTOR(S) : Walter Hunger

It is certified that error appears in the above—identified patent and that said Letters Patent is hereby corrected as shown below:

On the title page:
The spelling of the inventor's name has been changed from "Walter Hünger" to --Walter Hunger--.

Signed and Sealed this

Twenty-second Day of February 1983

[SEAL]

Attest:

GERALD J. MOSSINGHOFF

*Attesting Officer*  *Commissioner of Patents and Trademarks*